Feb. 15, 1966    C. A. SECKERSON ETAL    3,235,209
FASTENER
Filed Nov. 10, 1964    2 Sheets-Sheet 1

INVENTORS:
CLIFFORD ALEXANDER SECKERSON &
DOUGLAS WILLIAM BIRMINGHAM,
By Philip E. Parker
ATT'Y.

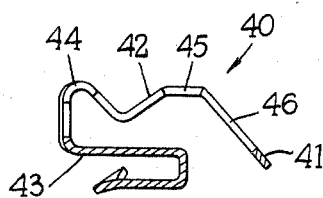
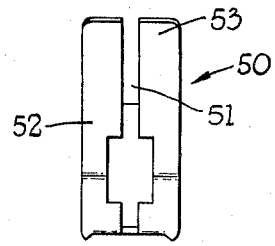
FIG.7  FIG.8
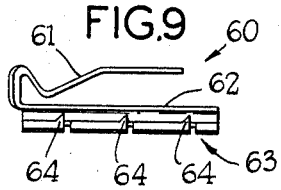
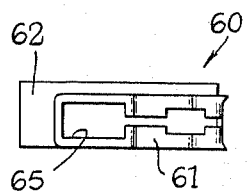
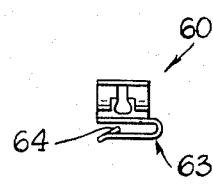
FIG.10  FIG.11
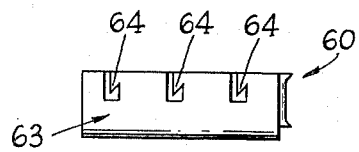
FIG.12

United States Patent Office 3,235,209
Patented Feb. 15, 1966

3,235,209
FASTENER
Clifford Alexander Seckerson, Iver Heath, and Douglas William Birmingham, Ickenham, Uxbridge, England, assignors to United-Carr Incorporated, Boston, Massachusetts, a corporation of Delaware
Filed Nov. 10, 1964, Ser. No. 410,251
Claims priority, application Great Britain, Nov. 19, 1963, 45,645/63
8 Claims. (Cl. 248—73)

The present invention relates generally to cable engaging fasteners and more particularly to a fastener which can be used to attach a sheathed cable to a support panel.

It is known from U.S. Patent No. 3,116,646 to provide a fastener which will attach a sheathed cable to a panel edge so as to hold the sheath relative to the panel while allowing movement of the cable through the fastener and relative to the panel. Sheathed cables, of the type used for instance on carburettor controls, are formed with a nipple at one end and hitherto it has been necessary to thread the cable through such known clips and then solder the nipple on to the end of the cable.

It will be appreciated that this operation is time-consuming and uneconomic and it is an object of the present invention to provide a fastener for attaching a sheathed cable to a panel which enables the cable having a nipple already soldered or otherwise attached thereto to be engaged on the fastener.

According to the invention there is provided a fastener for attaching a sheathed cable substantially in parallel to the surface of a panel, comprising a single strip of resilient material of R-shape providing a web portion and two arms extending therefrom, an inwardly directed elbow on one of the arms, means on the other arm enabling it to be attached to a panel edge and the web portion and one arm being continuously slotted to provide an aperture in the web portion into which the cable may be pressed through the continuous slotting and an aperture in the inwardly directed elbow of greater width than the aperture in the web portion and providing a transverse edge adapted to bear resiliently against the sheath to prevent movement thereof relative to the cable.

Figure 1:
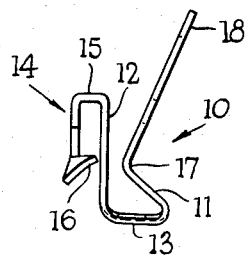
Figure 2:
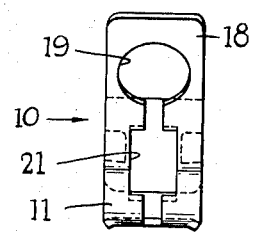
Figure 3:
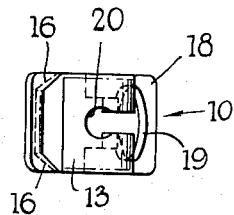
Figure 4:
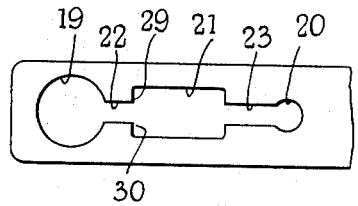
Figure 5:
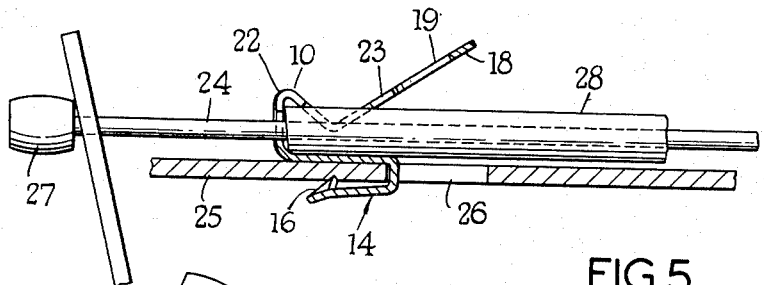
Figure 6:
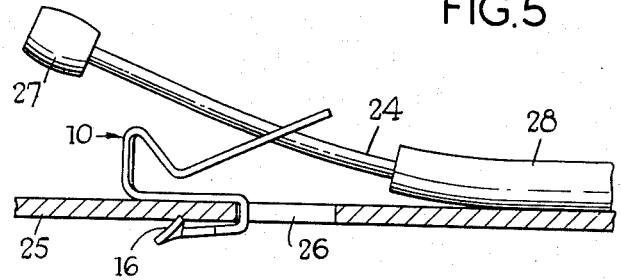

Preferred embodiments of the invention will now be described with reference to FIGURES 1 to 12 of the accompanying drawings in which:

FIGURES 1, 2 and 3 are respectively a side elevation, plan view and end elevation of a fastener, FIGURE 4 shows a part of a blank from which the fastener is formed, FIGURES 5 and 6 are elevations illustrating an assembly of a sheathed cable held to a support panel by the fastener of FIGURES 1 to 3, FIGURES 7 and 8 are respectively a sectional side elevation and a plan view showing two modifications of the fastener shown in FIGURES 1 to 3, and FIGURES 9 to 12 are respectively a side elevation plan, end elevation and underplan of a third modification of the fastener of FIGURES 1 to 3.

A fastener, indicated generally at 10 in FIGURE 1 is formed from a single parallel sided strip of steel which after being sheared and bent to the final shape shown is rendered resilient and preferably rustproof in any known or convenient manner.

The fastener 10 comprises two arms 11 and 12 joined by a web 13 and a U-shaped support engaging clip 14 which is formed by an extension 15 of the arm 12.

The U-shaped clip 14 is formed with internal prongs 16 which are directed rearwardly of the clip and adapted to retain the clip on a panel edge.

The arm 11 is bent intermediate its length towards the arm 12 to form an elbow 17 and so as to form with the arm 12 a portion of generally R-shape. The free end 18 of the arm 11 has a circular aperture 19.

A circular aperture 20 of smaller diameter than the aperture 19, is formed in the web 13 and a rectangular aperture 21 of a width lying between the diameters of the apertures 19 and 20 is formed in the elbow 17.

The two apertures 19 and 20 are joined by a continuous slot 22 and the apertures 20 and 21 are joined by a continuous slot 23. The width of the slots 22 and 23 is less than the diameter of the aperture 20 and in the finished fastener the apertures 19, 20 and 21 are in alignment. This is shown clearly in FIGURE 3.

The fastener 10 is designed for use in the manner shown in FIGURES 5 and 6 to hold a sheathed cable 24 to an apertured support panel 25.

The fastener 10 is first attached to the support panel 25 by engaging the clip 14 over the edge of an aperture 26 in the panel in a well known manner.

The cable 24 which has an integral nipple 27 at one end, is then threaded through the aperture 19 into the position shown in FIGURE 5. The cable 24 is snap-engaged down through the slots 22, 23 so that it extends through the aperture 20 in the web of the fastener. The cable 24 may be either a clearance fit or a light push-fit through the slots 22, 23.

Finally the free end of the arm 11 is lifted away from the arm 12 and the sheath 28 is pressed between the side edges of the aperture 21 in the elbow 17 until it butts against the web 13. The arm 11 is then lowered and the diameter of the sheath is such that one or both of the end edges of the aperture 21, and preferably edges 29, 30 which are adjacent the web, press resiliently down onto the sheath to resist its withdrawal from the fastener in the direction away from the web.

The structure of the fastener described and claimed in our earlier Patent No. 3,116,646 is such that the cable has to be passed through the aperture in the web before the nipple is soldered or otherwise attached to the cable. The fastener 10 described herein has the advantage over our earlier fastener that the nipple 27 can be soldered to the cable 24 before the cable is attached to the fastener.

In a modification of the fastener 10, which is indicated generally at 40 in FIGURE 7 the free end 41 of an elbowed arm 42 is bent downwardly towards the plane of the other arm 43. This enables the cable 24 to be snap-engaged down through both slots 44 and 45 and the sheath 28 is then passed through an aperture 46 in the free end 41 of the arm 42. In all other respects the fastener 40 is similar to the fastener 10. The fastener 40 has the advantage over the fastener 10 that it eliminates the necessity to thread the cable 24 through the aperture in the free end of the elbowed arm.

In a further modification of the fastener 10, which is indicated generally at 50 in FIGURE 8 a continuous slot 51 is so formed in an elbowed arm 52, that it runs out of the free end 53 of the elbowed arm 52. In all other respects the fastener 50 is similar to the fastener 10 and, in use the cable 24 is snap-engaged or pressed through the continuous slot 51 into the aperture formed in the web. Thus the fastener 50 has the same advantage over the fastener 10 as the fastener 40 in that it eliminates the need to thread the cable 24 through an aperture in the free end of the elbowed arm.

FIGURES 9 to 12 illustrate yet a further modification 60 of the fastener 10. The fastener 60 is similar to the fastener 10 except that it has an elbowed arm 61, the free end of which is bent so as to extend generally in parallel with the other arm 62 and the other arm 62 is extended laterally of the strip and bent to U-shape to form a panel engaging clip 63 having prongs 64 directed rearwardly towards the web of the clip 63 and transversely towards one side edge of the clip.

The fastener 60 also differs from the fastener 10 in that the free end of the elbowed arm 61 is formed with a rectangular aperture 65.

The fastener 60 is used in the same manner as the fastener 10 except that the clip 63 is designed to be applied to an edge of the support panel either by pressing the limbs of the clip 63 over the panel edge until the panel edge butts against the web of the clip or by sliding the limbs along the edge of the panel until the fastener is in the correct position. It will be seen that the direction of the prongs is such that the clip 63 can be slid in one direction only over a panel edge and will resist withdrawal in the opposite direction.

What we claim is:

1. A resilient fastener for attaching a sheathed cable substantially in parallel to the surface of a panel, comprising a single strip of resilient material of R-shape providing a web portion and two arms extending therefrom, an inwardly directed elbow on one of the arms, means on the other arm enabling it to be attached to a panel edge and the web portion and one arm being continuously slotted to provide an aperture in the web portion into which the cable may be pressed through the continuous slotting and an aperture in the inwardly directed elbow of greater width than the aperture in the web portion and providing a transverse edge adapted to bear resiliently against the sheath to prevent movement thereof relative to the cable.

2. A fastener as claimed in claim 1, in which the continuous slotting runs out of the end of the said one arm.

3. A fastener as claimed in claim 2, in which the aperture in the web portion is circular and of greater diameter than the width of the continuous slotting.

4. A fastener as claimed in claim 3, in which the said other arm is extended laterally with respect to the single strip of material and bent to provide a U-shaped panel edge engaging clip having internal retaining prongs.

5. A fastener as claimed in claim 1, in which the said one arm is provided with a second aperture adjacent the elbow of greater width than the aperture in the elbow and through which the cable may be threaded prior to location through the aperture in the web portion and the continuous slotting extends from the aperture in the web portion to the second aperture.

6. A fastener as claimed in claim 5, in which the said other arm is extended laterally with respect to the single strip of material and bent to provide a U-shaped panel edge engaging clip having internal retaining prongs.

7. A fastener as claimed in claim 5, in which the said one arm is bent about a transverse line located between the aperture in the elbow and the second aperture to provide an apertured free end extending towards the said other arm.

8. A fastener as claimed in claim 7, in which the aperture in the web portion, the aperture in the elbow and the second aperture in the one arm are in alignment.

References Cited by the Examiner

UNITED STATES PATENTS

| | | | |
|---|---|---|---|
| 2,657,442 | 11/1953 | Bedford | 24—81 |
| 2,665,103 | 1/1954 | Flora et al. | 248—314 |
| 3,107,076 | 10/1963 | Rosselet | 248—71 |

CLAUDE A. LE ROY, *Primary Examiner.*